Figure 3:
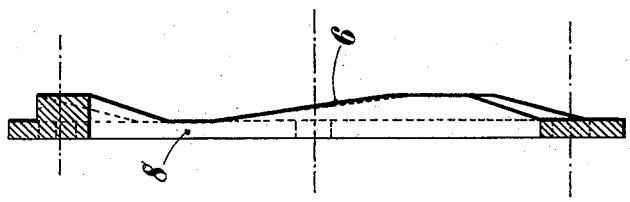

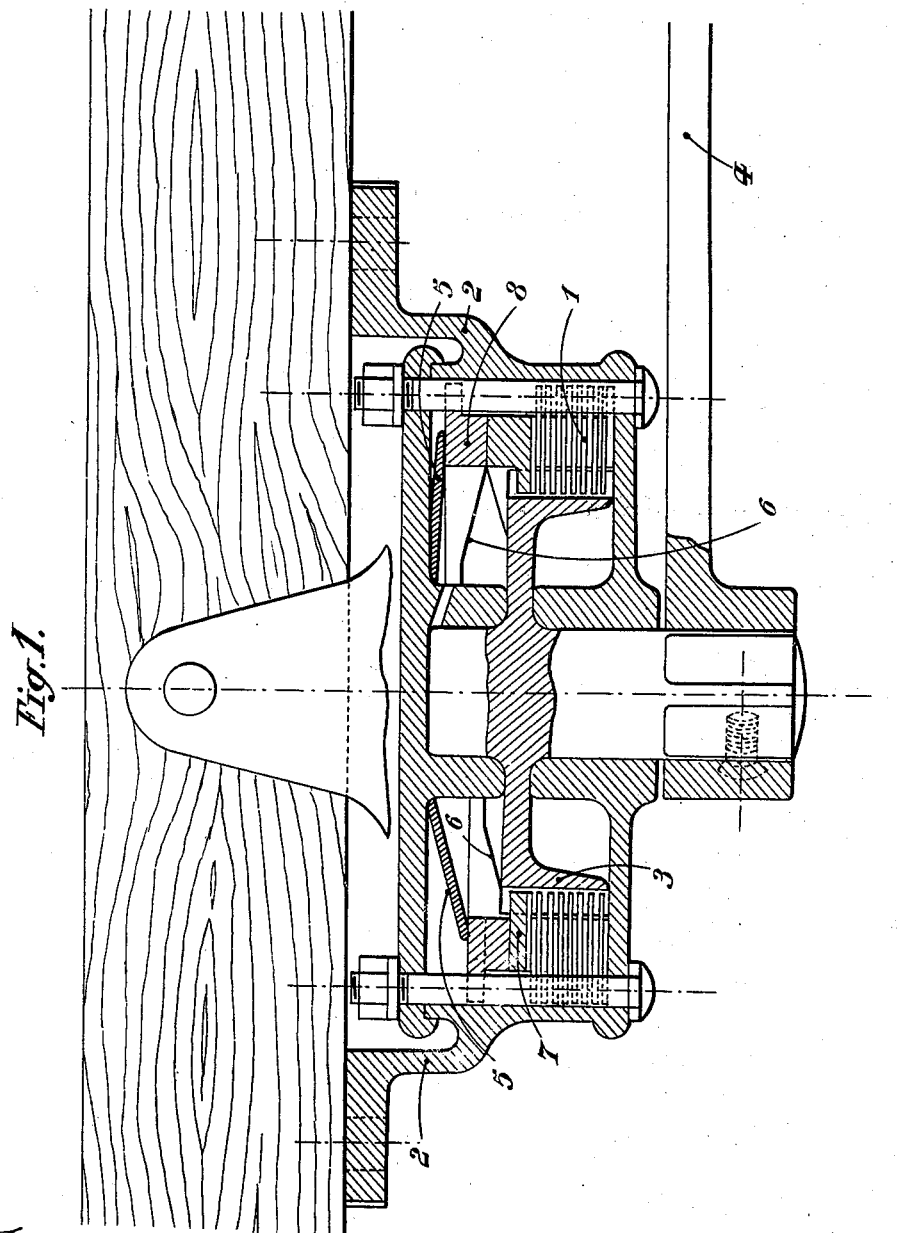

No. 872,825. PATENTED DEC. 3, 1907.
A. KREBS.
APPARATUS FOR CHECKING OR DEADENING THE VIBRATIONS IMPARTED TO SUSPENDED VEHICLES.
APPLICATION FILED MAR. 29, 1906.

3 SHEETS—SHEET 2.

Witnesses:

Inventor
Arthur Krebs

No. 872,825. PATENTED DEC. 3, 1907.
A. KREBS.
APPARATUS FOR CHECKING OR DEADENING THE VIBRATIONS IMPARTED TO SUSPENDED VEHICLES.
APPLICATION FILED MAR. 29, 1906.

3 SHEETS—SHEET 3.

Witnesses:
Inventor
Arthur Krebs
By James L. Norris.
Atty.

# UNITED STATES PATENT OFFICE.

ARTHUR KREBS, OF PARIS, FRANCE, ASSIGNOR TO SOCIÉTÉ ANONYME DES ANCIENS ETABLISSEMENTS PANHARD ET LEVASSOR, OF PARIS, FRANCE.

APPARATUS FOR CHECKING OR DEADENING THE VIBRATIONS IMPARTED TO SUSPENDED VEHICLES.

No. 872,825.     Specification of Letters Patent.     Patented Dec. 3, 1907.

Application filed March 29, 1906. Serial No. 308,769.

*To all whom it may concern:*

Be it known that I, ARTHUR KREBS, engineer, citizen of the French Republic, residing at Paris, France, have invented certain new and useful Improvements in Apparatus for Checking or Deadening the Vibrations Imparted to Suspended Vehicles, of which the following is a specification.

This invention relates to apparatus for checking or deadening the vibrations imparted to suspended vehicles on passing over an obstacle.

When vehicles suspended on their axles by springs encounter some irregularity of level, the springs bend, and the box tends to make an oscillatory movement which, theoretically, would not cease if the energy stored up in the spring at the moment of its leaving its position of equilibrium be not absorbed more or less rapidly owing to various causes, among others the friction of the spring plates against each other. It has been sought to check or deaden these vibrations by increasing this natural friction, and by creating special frictions to absorb the energy stored up by the spring at the time of its being forced out of shape. This is the principle of the friction suspension brakes. But in all the known appliances of this kind the friction retains a determined value resulting from the construction of the appliance, and this friction always the same, absorbs an unvarying quantity of energy. It is, therefore, readily understood that it only forms an imperfect solution of the problem. The energy stored up by the spring when bending out of shape is a function of the amount of irregularity of level. A constant friction deadener therefore is only suitable for a given change in the level. If there is a deviation from this in one direction or the other the braking will be too energetic or else insufficient.

The system of braking forming the subject of the present invention is characterized by a variable friction regulated by the flection of the spring, and the energy of which corresponds for each change of level to the energy stored up by the spring; this flection must give rise in the brake to a friction which will always be proportionate.

The invention has for its object improvements in the apparatus described in the application for U. S. A. Letters Patent S. N. 282,070, filed October 9, 1905.

Figure 2:
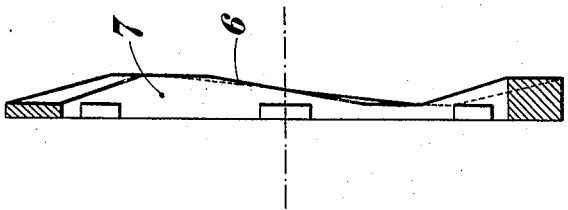
Figure 4:
Figure 5:
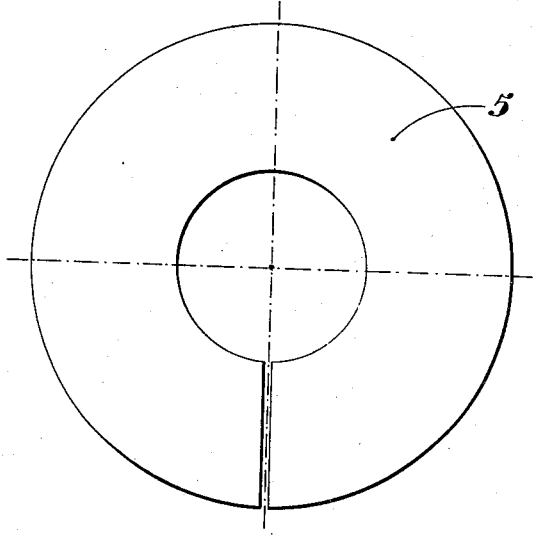

On the accompanying drawings: Figure 1 is a horizontal section of the apparatus constructed according to the invention. Figs. 2 and 3 are details. Fig. 4 is a view in elevation of the spring when uncompressed; and Fig. 5 is a plan view of the same.

The friction parts are formed by two sets of superimposed round disks or washers 1, connected alternatively with the box 2 fixed on the frame of the vehicle, and the drum 3 on the shaft of which is fitted the lever 4 connected with the axle by a crank. The pressure on the whole of the washers 1 is always furnished by a spring 5. This spring is a conical steel spring which has been split following one generant of the cone, as it is shown in Figs. 4 and 5. This arrangement, different from the ordinary conical ring shaped springs, insures that strain exercised by the spring upon the washers is constantly proportionate to the reductions of the arrow of the spring, even when the spring is quite flattened. The spring is shown uncompressed on the left part of Fig. 1, and compressed on the right part of said figure.

Curved slopes 6 are carried by two rings 7, 8 shown in section Figs. 2 and 3. These rings 7 and 8 have their slope placed opposite each other. One is connected with the box 2 and the other with the drum 3. In the position of rest, under load, the lever 4 is regulated so as to place the ring 7 in its medium position, *i. e.* in the position shown on the left of Fig. 1. In this position the spring 5 is not compressed, the disks or washers 1 are not pressed against each other and the ring 7 may begin to turn without experiencing resistance. As soon as the axle begins to move relatively to the box in one direction or the other it causes the rotation of the ring 7 by means of the lever 4. It will be seen that on each vertical displacement of the axle the relative shift of the two curved slopes 6 tends to bring closer or shift apart the disks 7 and 8 with regard to each other, whence there results a compression or release of the spring 5. If the spring 5 is compressed it transmits its pressure to the disks or washers 1 through the rings 7, 8. The friction strain therefore grows proportionately to the angular movement of the lever 4—that is to say—practically according to the movement of the axle relatively to its position at rest. By suitably combining the number of plates or blades, the flexibility of the spring 5 and the slope of the helicoidal surfaces, the friction strains required in each case are obtained.

Having now particularly described and ascertained the nature of my said invention, and in what manner the same is to be performed, I declare that what I claim is:

1. An apparatus of the class described, comprising a case, a movable member arranged within the case, superimposed washers alternately connected to the movable member and the case, an elastic element coöperative with the case and the movable member, and cam elements, one cam element carried by the case and the other by the movable member, and the cam faces of each adapted to traverse one another.

2. An apparatus of the class described, comprising a box connected with a vehicle frame, a rotatable element movable within the box and connected with a vehicle axle, superimposed washers connected alternately with the box and with the movable element, a split conical shaped spring disk mounted within the box, and annular members interposed between the washers and the conical disk and having opposed working surfaces for traversing each other.

In testimony whereof I have hereunto set my hand in presence of two subscribing witnesses.

ARTHUR KREBS.

Witnesses:
HANSON C. COXE,
EMILE KLOTZ.